(12) United States Patent
Rewerts et al.

(10) Patent No.: US 11,447,238 B2
(45) Date of Patent: Sep. 20, 2022

(54) FLOW FENCE FOR AN AIRCRAFT WINGLET

(71) Applicant: American Honda Motor Co., Inc., Torrance, CA (US)

(72) Inventors: Scott Rewerts, Summerfield, NC (US); Yuichi Kawamura, Greensboro, NC (US); Kui Ou, Greensboro, NC (US); Michimasa Fujino, Summerfield, NC (US); Kazuhisa Mahiko, Greensboro, NC (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 428 days.

(21) Appl. No.: 16/217,756

(22) Filed: Dec. 12, 2018

(65) Prior Publication Data

US 2020/0023943 A1   Jan. 23, 2020

Related U.S. Application Data

(60) Provisional application No. 62/597,560, filed on Dec. 12, 2017.

(51) Int. Cl.
*B64C 23/06* (2006.01)
*B64C 3/14* (2006.01)
(Continued)

(52) U.S. Cl.
CPC ............. *B64C 23/069* (2017.05); *B64C 3/14* (2013.01); *B64C 3/58* (2013.01); *B64C 5/08* (2013.01)

(58) Field of Classification Search
CPC   B64C 23/069; B64C 3/58; B64C 5/08; B64C 3/00; B64C 3/14
See application file for complete search history.

(56) References Cited

U.S. PATENT DOCUMENTS 2,802,630 A    8/1957   Birchill et al.
4,238,094 A    12/1980  McGann
(Continued)

FOREIGN PATENT DOCUMENTS

CN   203211514     *  9/2013   ............. B64C 39/02
CN   203211514 U     9/2013
(Continued)

OTHER PUBLICATIONS

Queijo, NACA Report 1203, Wind Tunnel Investigation at Low Speed of the Effects of Chordwise Wing Fences and Horizontal Tail Position on the Static Longitudinal Stability Characteristics of an Airplane Model with a 35° Sweptback Wing (Year: 1950).*
(Continued)

*Primary Examiner* — Assres H Woldemaryam
(74) *Attorney, Agent, or Firm* — Mark E. Duell; Rankin, Hill & Clark LLP

(57) ABSTRACT

A wing of an aircraft that includes a wing leading edge, a wing trailing edge, and a wing surface defined by a wing upper surface and a wing lower surface is described herein. The wing extends from the wing root to the wingtip, and the wingtip has a wingtip chord. A winglet extends from the wingtip and has a winglet leading edge, a winglet trailing edge, a winglet inboard surface, a winglet outboard surface, a winglet root having a winglet root chord, and a winglet tip. A flow fence is disposed on the wing surface inboard from the winglet and overlapping with the winglet. The flow fence is adapted to delay and/or prevent airflow separation on the winglet inboard surface at high angle of sideslip, increasing lateral stability and linearizing aircraft behavior at high angle of sideslip.

5 Claims, 21 Drawing Sheets

(51) Int. Cl.
  *B64C 3/58* (2006.01)
  *B64C 5/08* (2006.01)

(56) References Cited

U.S. PATENT DOCUMENTS

| | | | |
|---|---|---|---|
| 4,598,885 A | 7/1986 | Waitzman | |
| 4,674,709 A | 6/1987 | Welles | |
| 4,706,910 A * | 11/1987 | Walsh | B64C 21/10 244/130 |
| 4,714,215 A | 12/1987 | Jupp et al. | |
| 5,037,044 A * | 8/1991 | Seyfang | B64C 23/06 244/200.1 |
| 5,039,032 A | 8/1991 | Rudolph | |
| 5,772,155 A * | 6/1998 | Nowak | B64C 23/06 244/200.1 |
| 6,086,014 A * | 7/2000 | Bragg, Jr. | B64C 37/00 244/2 |
| 6,126,118 A * | 10/2000 | Fujino | B64C 7/02 244/130 |
| 6,997,413 B2 * | 2/2006 | Wukowitz | B64C 5/08 244/106 |
| 8,118,265 B2 | 2/2012 | Ferrari | |
| 8,910,910 B2 | 12/2014 | Emunds | |
| 8,936,219 B2 | 1/2015 | Roman et al. | |
| 8,944,386 B2 | 2/2015 | Gratzer | |
| 9,567,066 B2 | 2/2017 | Guida | |
| 2008/0203233 A1 * | 8/2008 | Schmidt | B64C 23/06 244/199.1 |
| 2011/0260008 A1 * | 10/2011 | Smith | F03D 1/065 244/199.4 |
| 2013/0341466 A1 * | 12/2013 | Emunds | B64C 3/58 244/199.4 |
| 2015/0041597 A1 | 2/2015 | Theurich et al. | |
| 2017/0029094 A1 | 2/2017 | Lynas et al. | |

FOREIGN PATENT DOCUMENTS

| | | | |
|---|---|---|---|
| CN | 104192294 B | 9/2016 | |
| DE | 202006003980 | 6/2006 | |
| EP | 2930103 A1 | 10/2015 | |
| GB | 2524824 A | 10/2015 | |
| WO | WO-2013007396 A1 * | 1/2013 | B64C 23/065 |

OTHER PUBLICATIONS

International Search Report and Written Opinion of PCT/US2018/065243 dated Feb. 27, 2019, 11 pages.
Extended European Search Report of S/N 18888882.0 dated Jul. 30, 2021, 9 pages.
Canadian Office Action of S/N 3084390 dated Oct. 14, 2021, 4 pages.

* cited by examiner

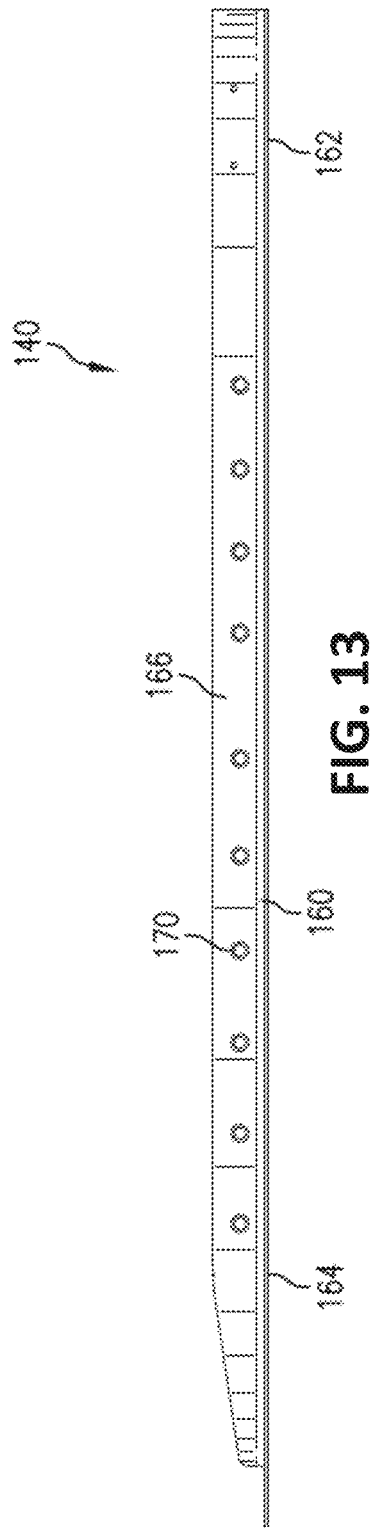
FIG. 13
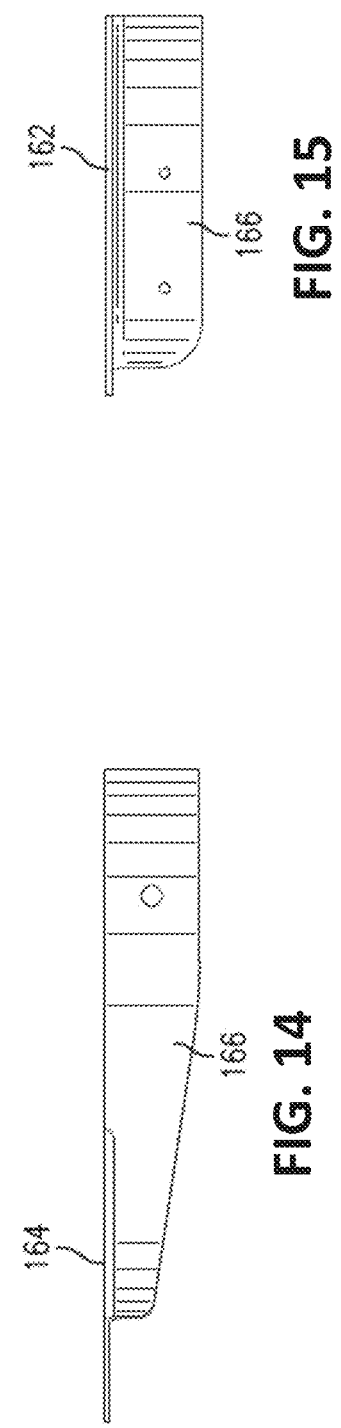
FIG. 14
FIG. 15

FLOW FENCE FOR AN AIRCRAFT WINGLET

The present application claims priority to U.S. Prov. App. Ser. No. 62/597,560 filed on Dec. 12, 2017, which is incorporated herein by reference.

BACKGROUND

Aircraft winglets are primarily useful to increase wing efficiency, decreasing the amount of induced drag created due to wing lift. Aircraft winglets which are canted upwards and outboards from an aircraft wingtip also typically contribute to positive lateral stability (i.e., the behavior of a fixed-wing aircraft flying at a sideslip angle to roll with the windward wing going wingtip-upwards and the leeward wing going wingtip-downwards, which rights the aircraft roll orientation from disturbances).

Fixed-wing aircraft frequently fly at high angles of attack (i.e., aircraft longitudinal attitude relative to the oncoming airflow) and high angles of sideslip (i.e., aircraft directional orientation relative to oncoming airflow). Upon approach to landing, fixed-wing aircraft must fly at low speed which requires a higher angle of attack to maintain sufficient lift for continued flight. As aircraft speed decreases during a landing flare just before touching down on the runway, the angle of attack required to maintain lift increases. Similarly during approach to landing, crosswinds (i.e., winds oriented at an angle to the runway centerline) require that aircraft fly at a sideslip angle with both roll and yaw control inputs to stay aligned with the runway centerline during landing. When the crosswind magnitude increases, or as the aircraft speed decreases relative to the crosswind speed, the angle of sideslip required to fly straight along the runway centerline increases.

Lateral stability is required for aircraft certification and flight safety. Lateral stability decreases pilot workload by tending to restore a wings-level attitude after gusts or other disturbances roll the aircraft, and if an aircraft's roll flight control system (e.g., ailerons) become inoperable during flight (namely, due to jamming, being cut by engine fragments during an engine rotor burst event, etc.), the pilot must still be able to steer the aircraft using an alternative means such as using lateral stability via the aircraft's yaw flight control system (e.g., rudder) and going to sideslip angles. The requirement for static lateral stability for aircraft is set forth in United States 14 Code of Federal Regulations (commonly abbreviated "CFR") section 23.177.

At high sideslip angles and angles of attack (i.e., when the winglet is at high-lift conditions), airflow over the inboard side of the winglet may separate from the surface. This separation effect reduces winglet lift, reducing lateral stability and causing a change in the rolling moment behavior of the aircraft. An aircraft must meet certification requirements with the reduced lateral stability. The accompanying change in rolling moment behavior is also considered an undesirable or unsatisfactory lateral control characteristic for an aircraft which may prevent certification of the aircraft. This may be partially prevented by adding devices to winglets to prevent the separated airflow; however, these devices can cause an increase in aerodynamic drag and aircraft weight which can degrade aircraft performance even at flight conditions where they are not required (e.g., at cruise-like conditions with mild angles of attack and near-zero sideslip angles). These devices also increase aircraft cost and they may be considered aesthetically unappealing.

During normal operations, aircraft frequently fly through a variety of atmospheric and meteorological conditions. At common flight altitudes (e.g., up to 45,000 feet above mean sea level), ambient atmospheric temperatures average between sea-level conditions and −70° F. Microscopic water droplets suspended in a clean atmosphere have the ability to exist in a supercooled state without any seed nuclei, which means that this moisture may exist as suspended liquid at temperatures below the typical freezing conditions. Intentional flight through conditions with below-freezing temperatures with suspended supercooled liquid water droplets is termed "Flight into Known Icing" (commonly abbreviated "FIKI"). During flight into known icing conditions, forward-facing aircraft surfaces collect water as they pass through it and seed water droplet nucleation. Without an ice protection system, this water freezes into ice which consequently builds up onto the aircraft surfaces. Due to the change in aircraft surface shape and texture, airframe ice accretions typically degrade aircraft performance, stability, and controllability. However, the positive static lateral stability requirement discussed previously still applies to aircraft even during flight into known icing conditions.

When an aircraft flies into known icing conditions, ice contamination may accumulate on forwards-facing surfaces without an ice protection system, including the winglet leading edge. Ice accumulation on the winglet leading edge contributes towards airflow over the winglet separating from the surface at lower, more common sideslip angles. This separation tendency impacts winglet lift, reducing lateral stability. Ice protection systems are known which may heat a winglet leading edge to prevent ice accumulation, or mechanically or chemically remove or prevent ice accumulation. However, these ice protection systems are often expensive, add significant weight, cost and complexity to the aircraft, require maintenance and additional aircraft safety systems (e.g., failure annunciation, leak detection for bleed air systems, etc.), and may cause a significant aircraft system design to be implemented into an existing aircraft design.

More broadly, many types of leading edge surface contamination may degrade airflow around the winglet and cause the same effects as ice accumulations. Similarly to flow surface contamination by ice accretions, a number of other ground and flight conditions may also contaminate leading edge surfaces with a variety of mediums (e.g., dirt, vegetative matter and other ground debris, ash, insects impacted in-flight at low altitudes, bird droppings, dried aircraft maintenance or operating fluid residue, etc.).

One known device to improve aircraft stall characteristics by changing the airflow separation pattern over the main wing (not the winglet) at high angles of attack is a wing stall fence. The wing stall fence is attached to the wing at a location much further inboard of the wingtip. Another known device found on aircraft are vortillons, which extend forward and below the main wing leading edge and generate vortices to improve the aircraft stall characteristics by changing the flow field over the main wing (not winglet) leading edge at high angles of attack. Neither wing stall fences nor vortillons contribute to increasing lateral stability of the aircraft.

Finally, another known device on an aircraft is a wingtip light blocking fence, which is smaller and far forwards of the winglet on the main wing leading edge and is used to block wingtip lights from shining directly into a pilot's eyes in the cockpit. Wingtip light blocking fences also do not contribute to increasing lateral stability.

BRIEF DESCRIPTION

According to one aspect, a wing of an aircraft comprises a wing leading edge, a wing trailing edge, and a wing surface defined by a wing upper surface and a wing lower surface. The wing extends from the wing root to the wingtip, and the wingtip has a wingtip chord. A winglet extends from the wingtip and has a winglet leading edge, a winglet trailing edge, a winglet inboard surface, a winglet outboard surface, a winglet root having a winglet root chord, and a winglet tip. A flow fence is disposed on the wing surface inboard from the winglet and overlapping with the winglet. The flow fence is adapted to delay and/or prevent airflow separation on the winglet inboard surface at high angle of sideslip, increasing lateral stability and linearizing aircraft behavior at high angle of sideslip.

According to yet another aspect, a method for preventing airflow separation on an inboard surface of a winglet extending from a wingtip of an aircraft wing at high angle of sideslip is provided. The method comprises positioning a flow fence on an upper side of the wing surface adjacent the winglet inboard surface; spacing the flow fence inwardly from the wingtip a distance not exceeding 100% of a length of a root chord of the winglet; and extending the flow fence on the wing upper surface to a first position overlapping with the winglet.

According to yet another aspect, a wing of an aircraft comprises a wing leading edge, a wing trailing edge, and a wing surface defined by a wing upper surface and a wing lower surface. The wing extends from the wing root to the wingtip, and the wingtip has a wingtip chord. A winglet extends from the wingtip and has a winglet leading edge, a winglet trailing edge, a winglet inboard surface, a winglet outboard surface, a winglet root having a winglet root chord, and a winglet tip. A flow fence is disposed on the wing surface inboard from the winglet. The flow fence extends from a first position located on the wing upper surface which overlaps with the winglet to a second position located on one of the wing upper surface and the wing lower surface. An inboard spacing of the flow fence from the wingtip does not exceed 100% of a length of the winglet root chord. The flow fence is adapted to delay and/or prevent airflow separation on the winglet inboard surface at high angle of sideslip, increasing lateral stability and linearizing aircraft behavior at high angle of sideslip.

BRIEF DESCRIPTION OF THE DRAWINGS

FIG. 13 is a top-down (planform) view of the flow fence of FIG. 12.

FIG. 14 is an aft view of the flow fence of FIG. 12.

FIGS. 15 and 16 are front views of the flow fence of FIG. 12.

DETAILED DESCRIPTION

An aircraft wing including a wing leading edge, a wing trailing edge, a wing upper surface, and a wing lower surface is described herein. In an exemplary embodiment, a winglet extends from a wingtip and has a winglet leading edge, a winglet trailing edge, a winglet inboard surface, and a winglet outboard surface. A flow fence disposed on the wing inboard from the wingtip extends to a position located on the wing upper surface which overlaps with the winglet. When the winglet leading edge has contamination including accreted ice, the aircraft may have a loss or degradation of lateral stability by airflow separation on the winglet inboard surface at high angle of sideslip. The flow fence delays and/or prevents airflow separation on the winglet inboard surface at high angle of sideslip, increasing lateral stability and linearizing aircraft behavior at high angle of sideslip without adding complex devices, such as ice protection system, weight and cost.

It should, of course, be understood that the description and drawings herein are merely illustrative and that various modifications and changes can be made in the structures disclosed without departing from the present disclosure. The term "angle of attack" is the angle between a chord line of a wing of the depicted fixed-wing aircraft and the oncoming airflow or relative wind. As is well known, as the angle of attack of the fixed-wing aircraft increases, separation of the airflow from the wing upper surface becomes more pronounced, first reducing the rate of increase of the lift coefficient with increase in angle of attack and second limiting the maximum achievable lift coefficient. The term "angle of sideslip" or "sideslip angle" is the angle between an aircraft centerline (e.g., the line dividing the aircraft left and right halves when the aircraft is viewed in a top-down (planform) view) and the oncoming airflow.

Figure 1:
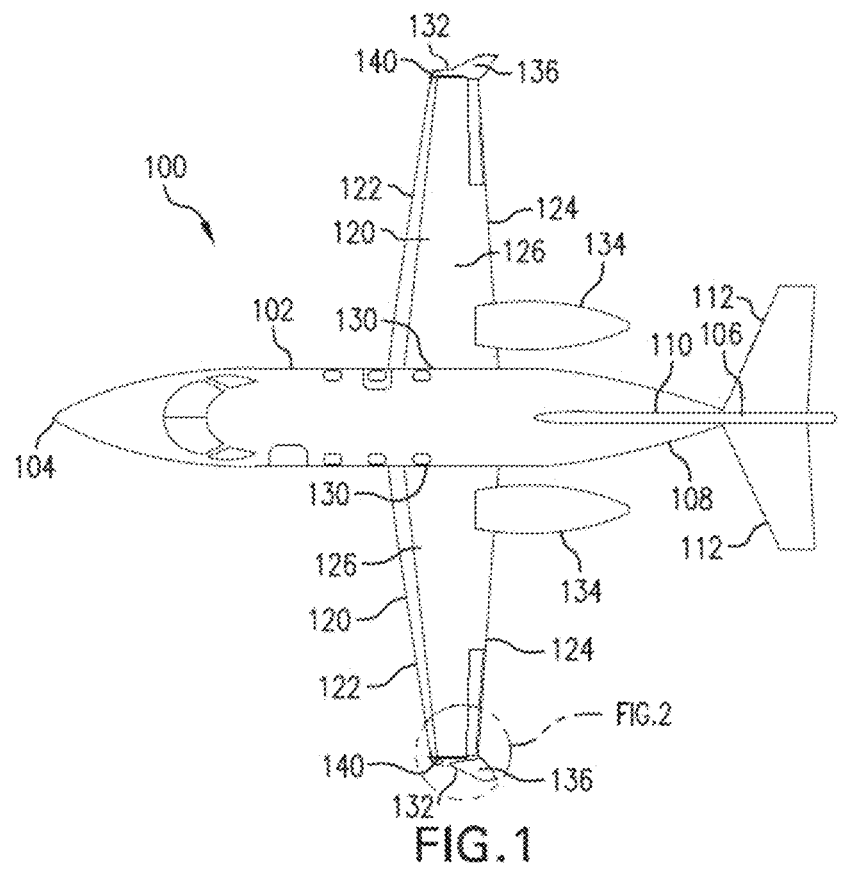
FIG. 1 is a top planform view of an aircraft including wings, each wing having an exemplary flow fence disposed on a wing surface inboard from a winglet.
Figure 2:
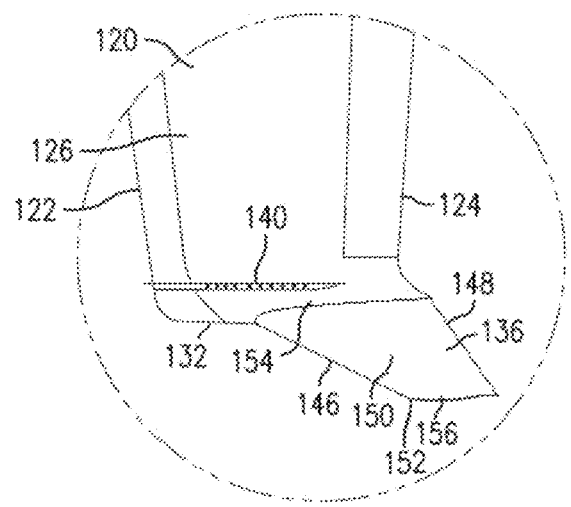
FIG. 2 is an enlarged view of a left-hand wingtip of the aircraft shown in FIG. 1.
Figure 3:
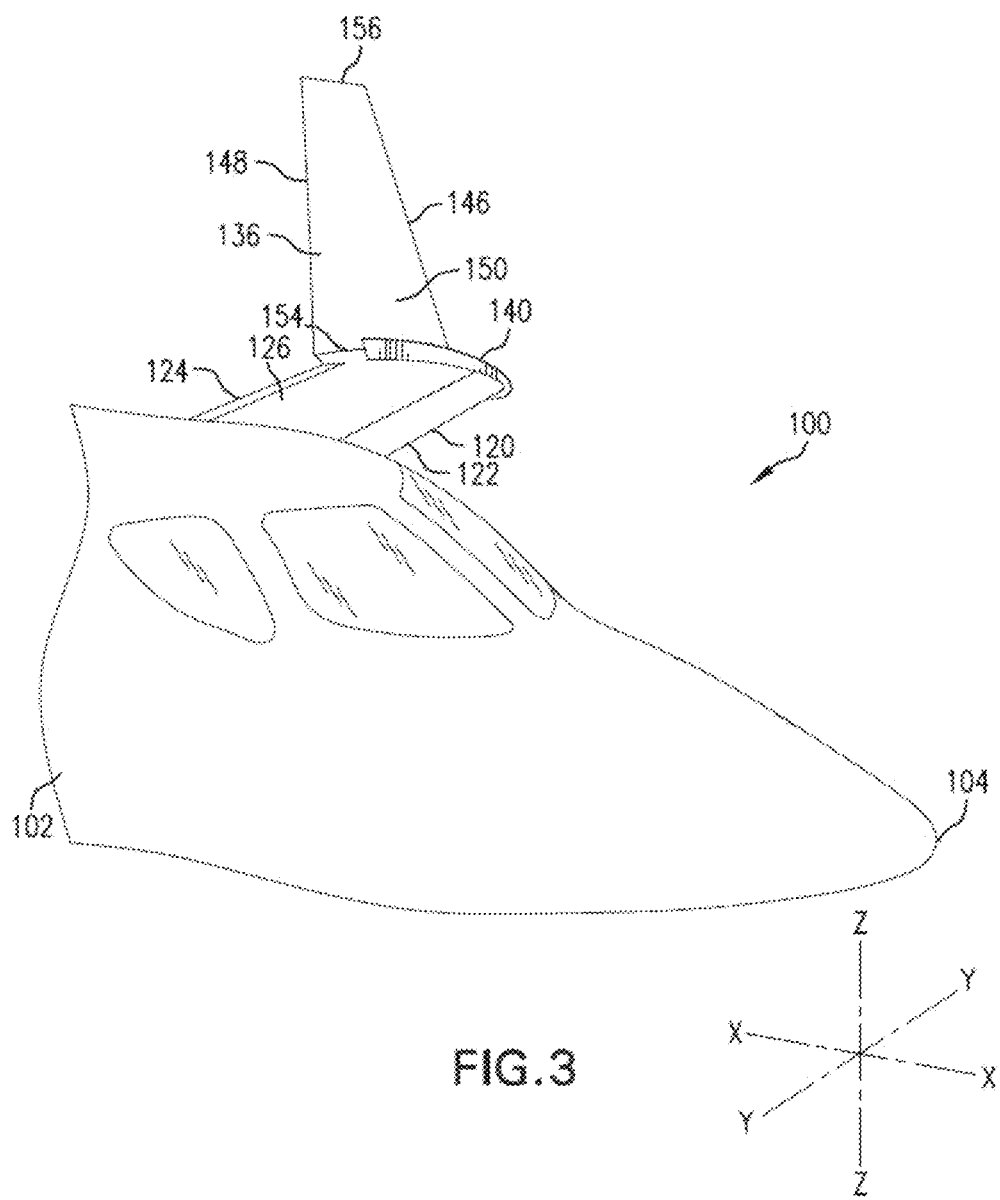
FIG. 3 is a partial side perspective view of the left-hand wingtip shown in FIG.

Referring now to the drawings, wherein like numerals refer to like parts throughout the several views, FIGS. 1-3 illustrate an aircraft 100 having a fuselage 102. The fuselage 102 may extend from a nose at a forward end 104 of the aircraft 100 to an empennage 106 at an aft end 108 of the fuselage 102. The empennage 106 may include one or more tail surfaces such as a vertical stabilizer 110 and/or a horizontal stabilizer 112 for control of the aircraft 100. The aircraft 100 may further include a pair of wings 120. In FIG. 3, the aircraft 100 may be defined with regard to a coordinate system having a longitudinal axis X, a lateral axis Y, and a vertical axis Z. The longitudinal axis X may be defined as extending through a general center of the fuselage 102 between the forward end 104 and the aft end 108 (i.e., the aircraft centerline extending from fuselage nose to fuselage tail). The lateral axis Y may be oriented orthogonally relative to the longitudinal axis X and may extend generally along the wings 120 outboard directions relative to the center of the fuselage 102 (e.g., typically going from the one wingtip towards the other wingtip). The vertical axis Z may be oriented orthogonally relative to the longitudinal axis X and lateral axis Y (i.e., typically going from below the aircraft to above the aircraft).

Figure 4:
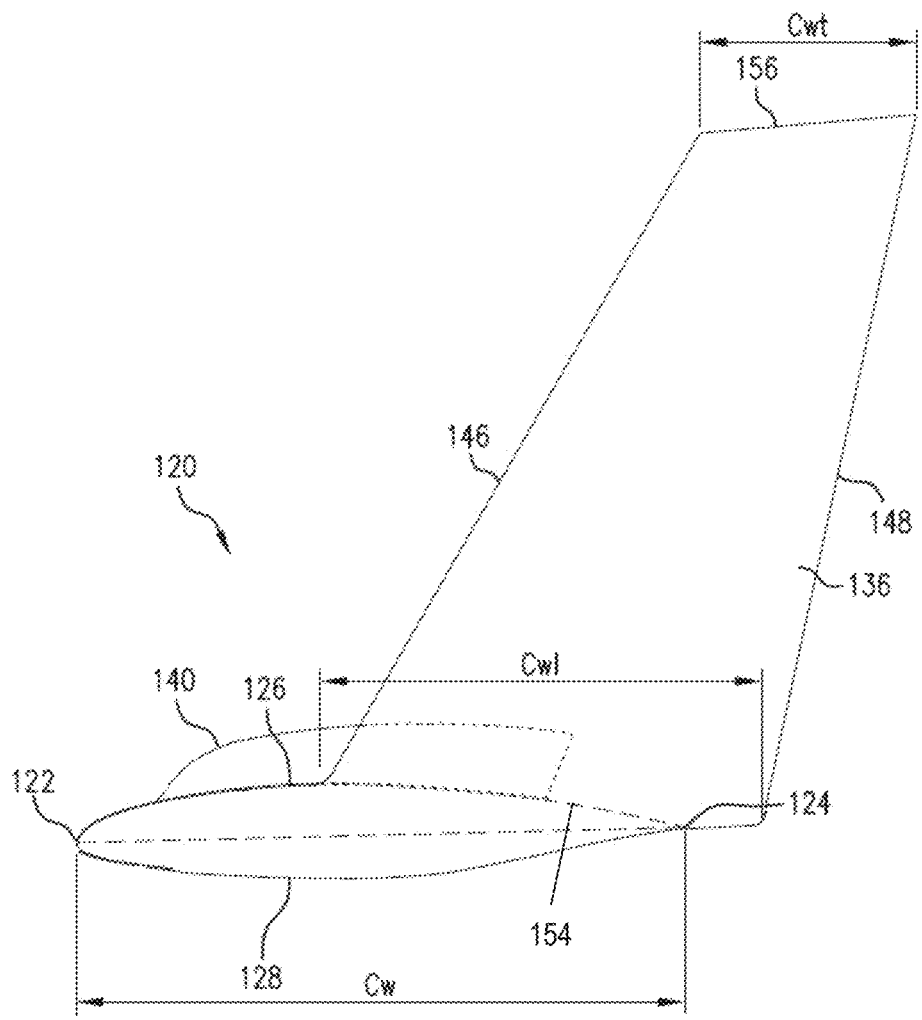
FIGS. 4-11 are outboard side views of the left-hand wingtip illustrating exemplary aspects of the flow fence according to the present disclosure.

Each wing 120 includes a wing leading edge 122 (the forward-facing edge of the wing), a wing trailing edge 124 (the aft-most edge of the wing), and a wing surface defined by a wing upper surface 126 (normally, a low-pressure flow surface) and a wing lower surface 128 (normally, a high-pressure flow surface, see, for example, FIG. 4). And each wing 120 extends laterally from a wing root 130 (nearest the fuselage 102) to a wingtip 132 (furthest from the fuselage 102). One or more propulsion units 134 may be mounted to the wings 120 or fuselage 102. Each wing 120 also includes a winglet 136 which may be substantially perpendicularly (typically, upwards) from the wingtip 132.

In the exemplary embodiment, a flow fence 140 is disposed on the wing 120, laterally inboard from the wingtip 132 and the winglet 136 (see FIG. 2). It should be noted that although the winglet 136 and the flow fence 140 of the present disclosure are described in the context of a fixed-wing aircraft such as the tube-and-wing aircraft 100 illustrated in FIG. 1, the winglet 136 and the flow fence 140 of the present disclosure may be applied to any aircraft of any configuration, without limitation (for example, any civil, commercial, or military aircraft, including hybrid wing-body aircraft, blended-wing aircraft, rotary wing aircraft, horizontal or vertical stabilizers or other auxiliary lifting surfaces). It should also be appreciated that the flow fence 140 may be employed as an original equipment component for new aircraft as well as to retrofit existing fleet aircraft. Because the flow fence 140 is coupled directly to support structures of the wing 120, it can be readily installed on existing aircraft.

Each winglet 136 includes a winglet leading edge 146, a winglet trailing edge 148, a winglet inboard surface 150 (which is typically a low-pressure flow surface), a winglet outboard surface 152 (which is typically a high pressure flow surface), a winglet root 154 (located adjacent to the wingtip 132), and a winglet tip 156 (which is opposite the winglet root). The winglet root 154 is affixed or otherwise coupled to the wing 120 at the wingtip 132. In the depicted aspect, the winglet 136 is swept aftwardly and may additionally be formed with a taper ratio of winglet tip chord $C_{wt}$ to winglet root chord $C_{wl}$, which is at the location where the winglet root 154 joins the wingtip 132 (see FIG. 4). In the depicted embodiment, the intersection of the winglet leading edge 146 with the wingtip 132 is located aft of the wing leading edge 122 at the wingtip 132. Although, it is contemplated that the intersection of the winglet leading edge 146 with the wingtip 132 may be located approximately at the wing leading edge 122. In the depicted embodiment, the winglet trailing edge 148 is located aft of the wing trailing edge 124. Although, it is contemplated that the winglet trailing edge 148 may join or intersect the wingtip 132 at any location that is no further aft than the wing trailing edge 124 and may join or intersect the wingtip 132 at a location that is approximately at the wing trailing edge 124. In the disclosed aspect, the winglet 136 is configured such that the winglet root chord $C_{wl}$ is shorter than a wingtip chord $C_w$ and a portion of the winglet root chord $C_{wl}$ extends aft of the wing trailing edge 124.

FIGS. 4-11 illustrate exemplary aspects of the flow fence 140 according to the present disclosure. In the depicted aspect of FIG. 4, the flow fence 140 extends from a forward position (aft of the wing leading edge 122) to an aft position (between the winglet leading edge 146 and the wing trailing edge 124 and/or the winglet trailing edge 148) on the wing upper surface 126 which overlaps with the winglet 136.

Figure 5:
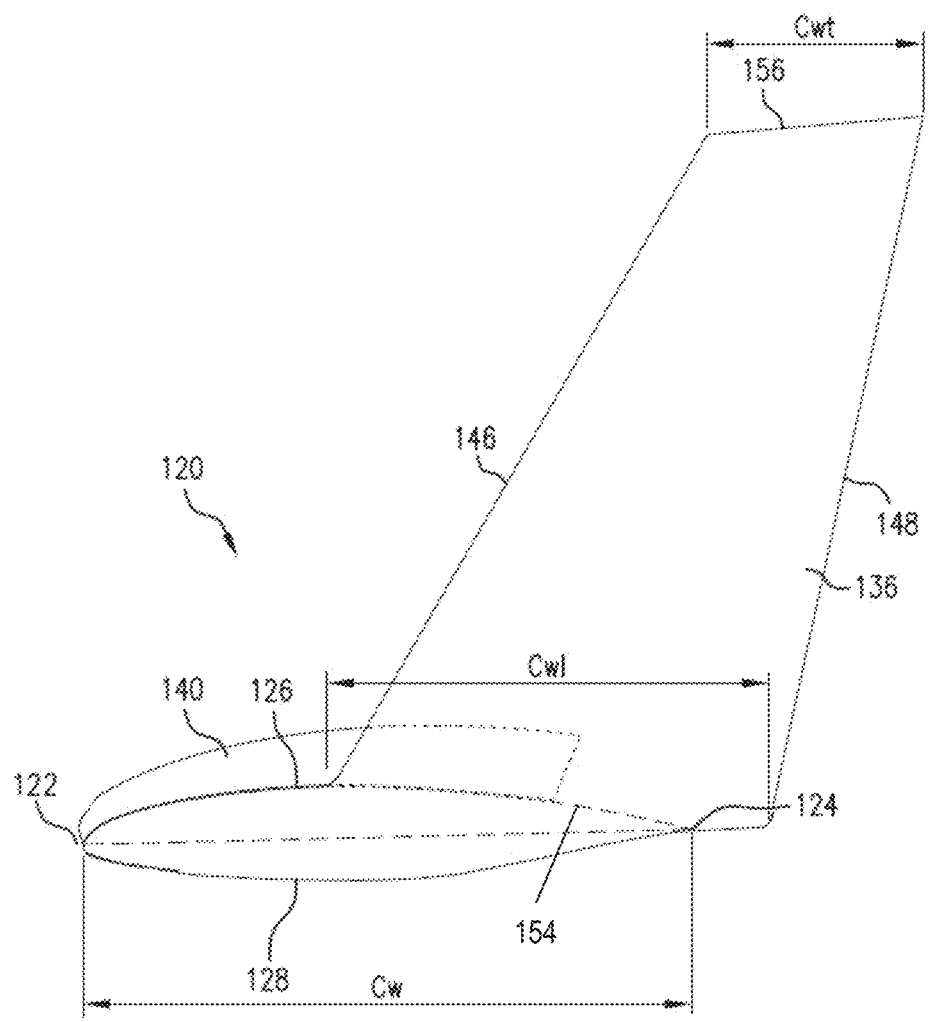

In the depicted aspect of FIG. 5, the flow fence 140 extends from a forward position (at the wing leading edge 122) to an aft position (between the winglet leading edge 146 and the wing trailing edge 124 and/or winglet trailing edge 148) on the wing upper surface 126 which overlaps with the winglet 136.

Figure 6:
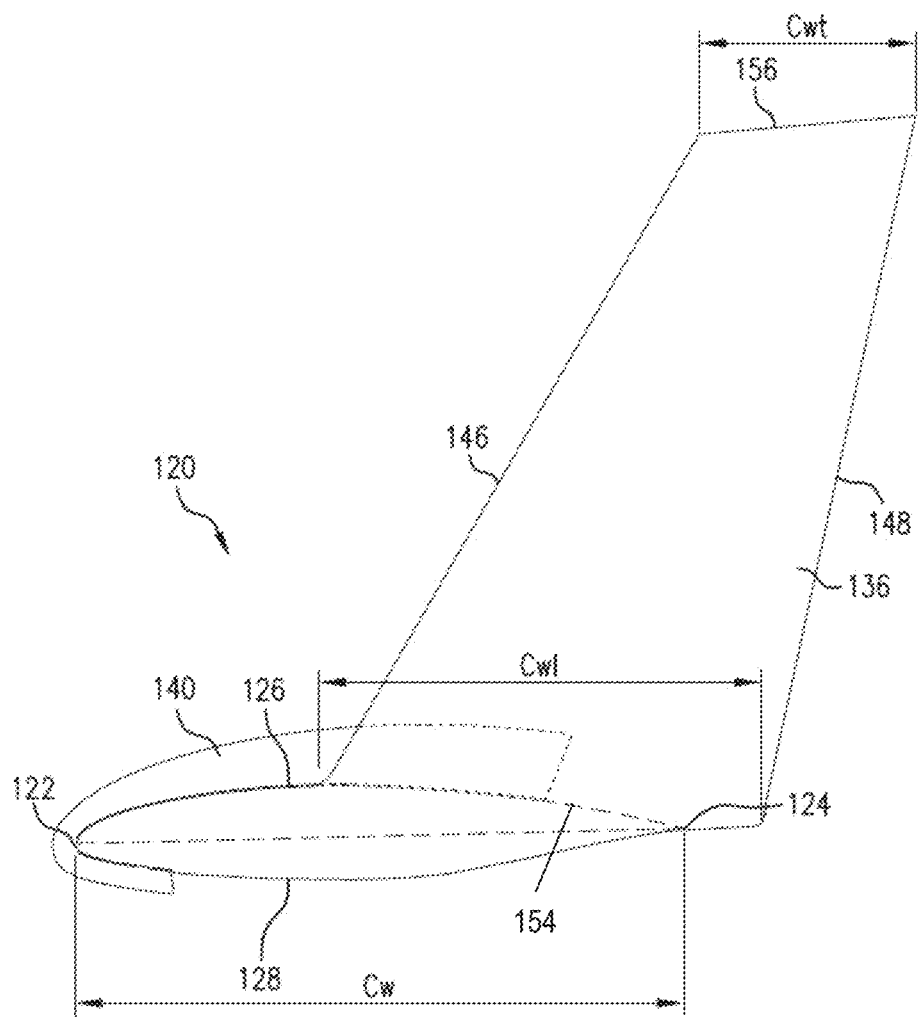

In the depicted aspect of FIG. 6, the flow fence 140 extends from a position between the wing leading edge 122 and the winglet leading edge 146 on the wing lower surface 128 around the wing leading edge 122 to a position between the winglet leading edge 146 and the wing trailing edge 124 and/or winglet trailing edge 148 on the wing upper surface 126 which overlaps with the winglet 136.

Figure 7:
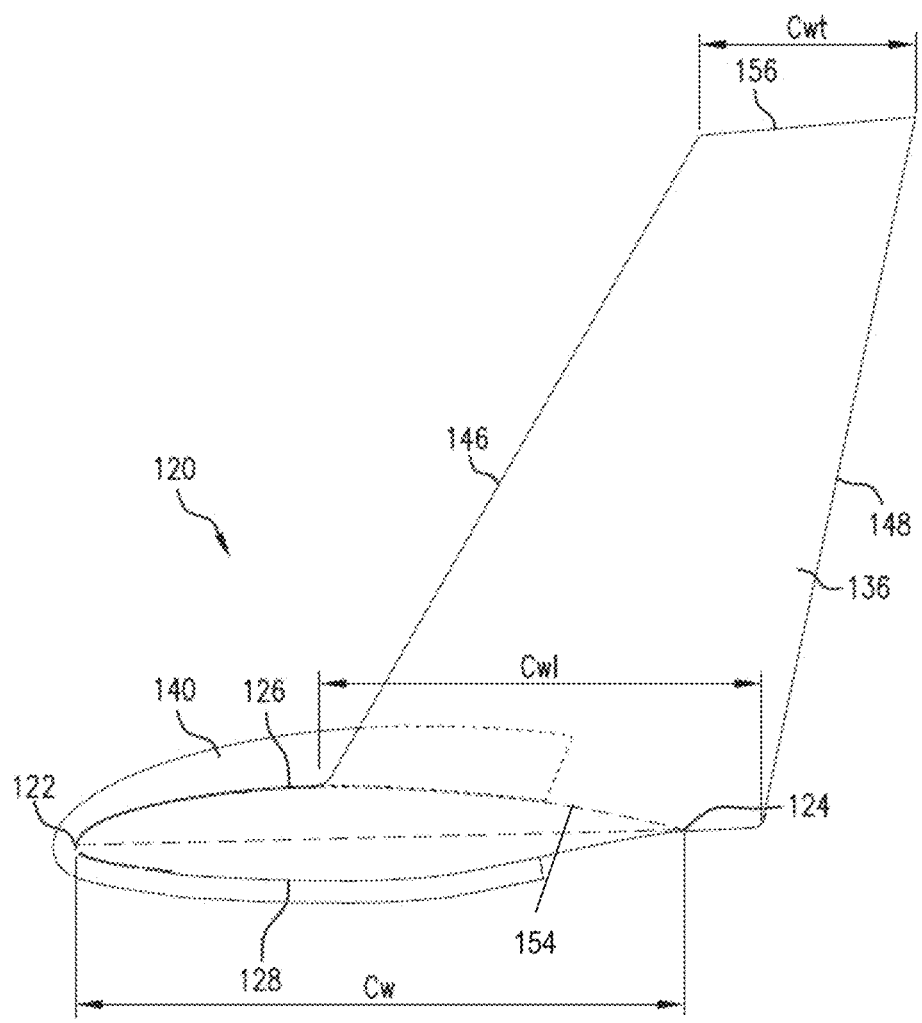

In the depicted aspect of FIG. 7, the flow fence 140 extends from a position between the winglet leading edge 146 and the wing trailing edge 124 and/or winglet trailing edge 148 on the wing lower surface 128 around the wing leading edge 122 to a position between the winglet leading edge 146 and the wing trailing edge 124 and/or winglet trailing edge 148 on the wing upper surface 126 which overlaps with the winglet 136.

Figure 8:
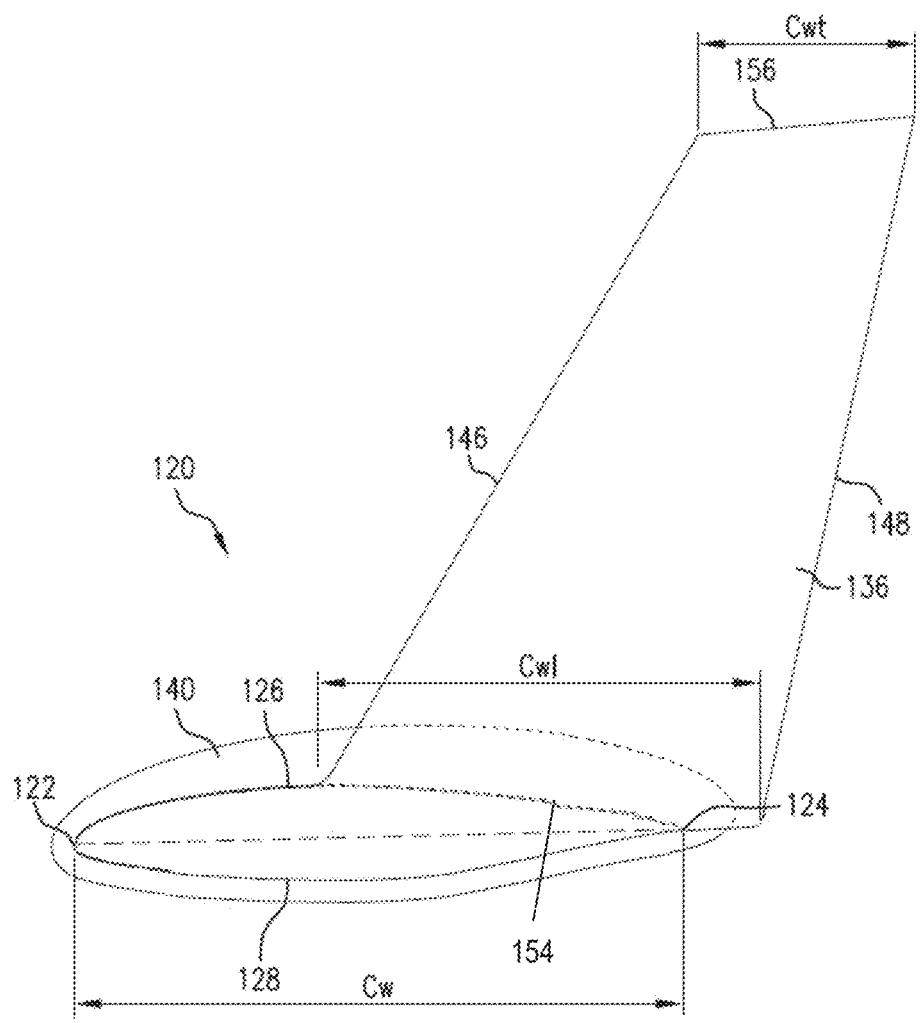

In the depicted aspect of FIG. 8, the flow fence 140 extends around the entire wing 120 on both the wing upper surface 126 and the wing lower surface 128.

Figure 9:
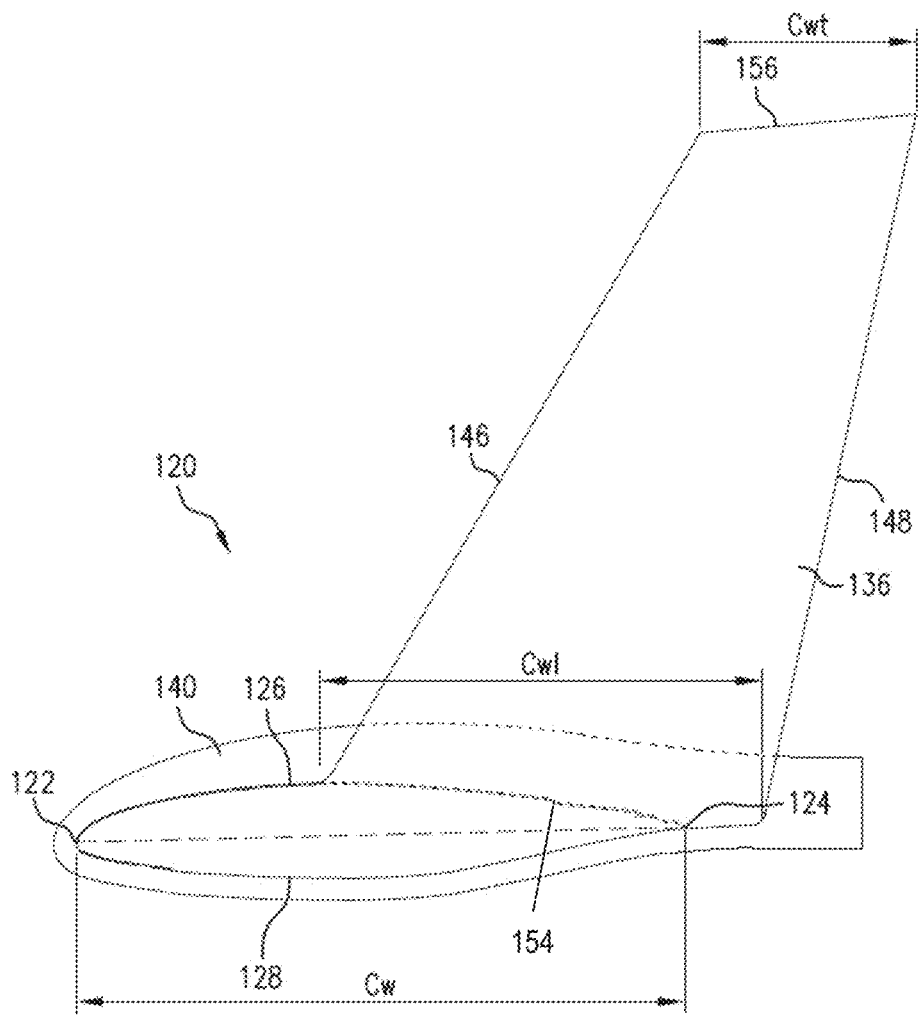

In the depicted aspect of FIG. 9, the flow fence 140 extends around the entire wing 120 on both the wing upper surface 126 and the wing lower surface 128, and also extends aft of the wing trailing edge 124 and/or winglet trailing edge 148.

Figure 10:
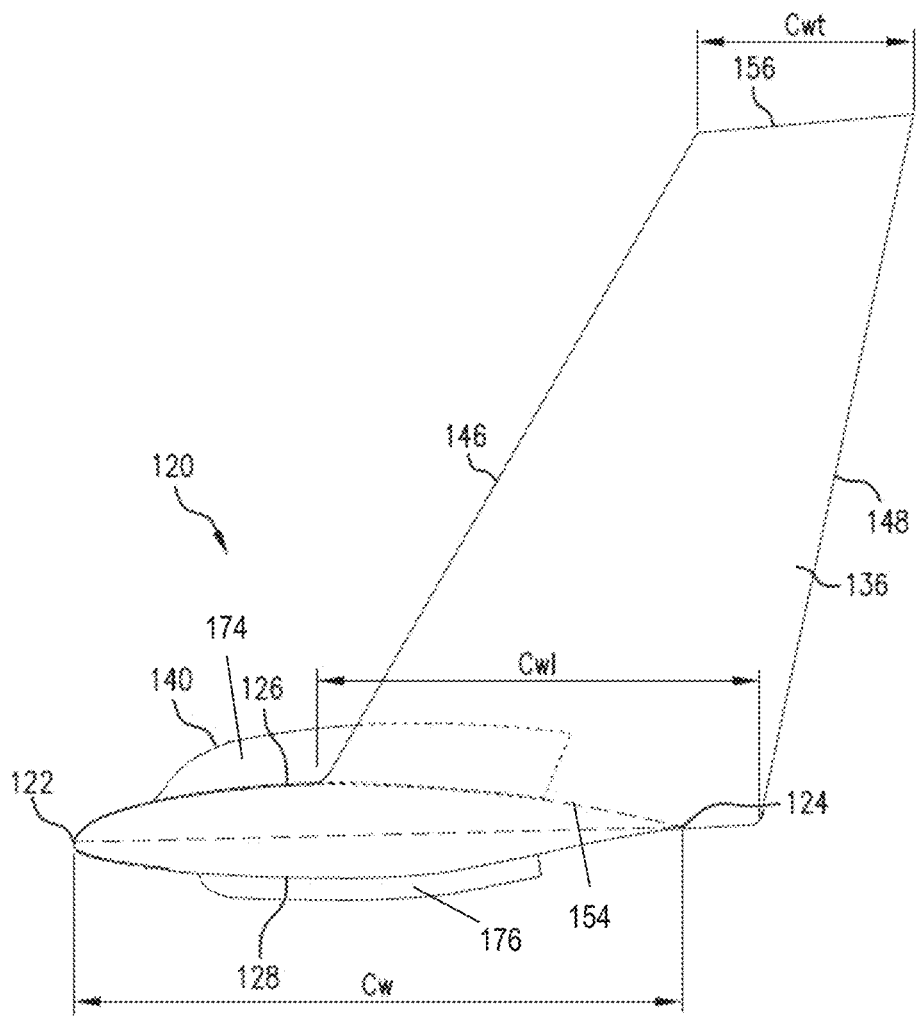

In the depicted aspect of FIG. 10, the flow fence 140 includes a first flow fence part 174 on the wing upper surface 126 and a separate second flow fence part 176 on the wing lower surface 128. Each of the first flow fence part 174 and second flow fence part 176 extends from a position between the wing leading edge 122 and the winglet leading edge 146 to a position between the winglet leading edge 146 and the wing trailing edge 124 and/or winglet trailing edge 148. The first flow fence part 174 overlaps with the winglet 136.

Figure 11:
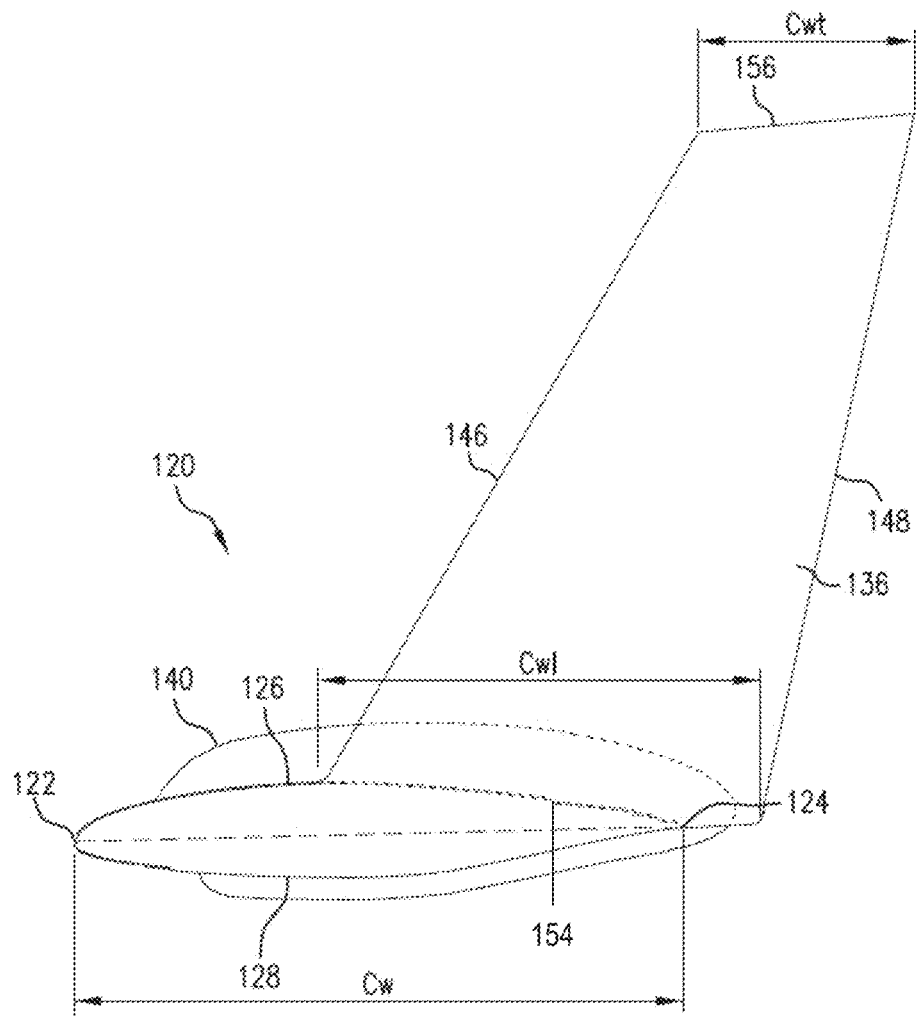

In the depicted aspect of FIG. 11, the flow fence 140 extends around the entire wing 120 on both the wing upper surface 126 and the wing lower surface 128, excluding a region of the wing leading edge 122 on both the wing upper surface 126 and the wing lower surface 128. More particularly, the flow fence 140 extends from a position between the wing leading edge 122 and the winglet leading edge 146 on the wing upper surface 126 around the wing trailing edge 124 to a position between wing leading edge 122 and the winglet leading edge 146 on the wing lower surface 128.

Figure 12:
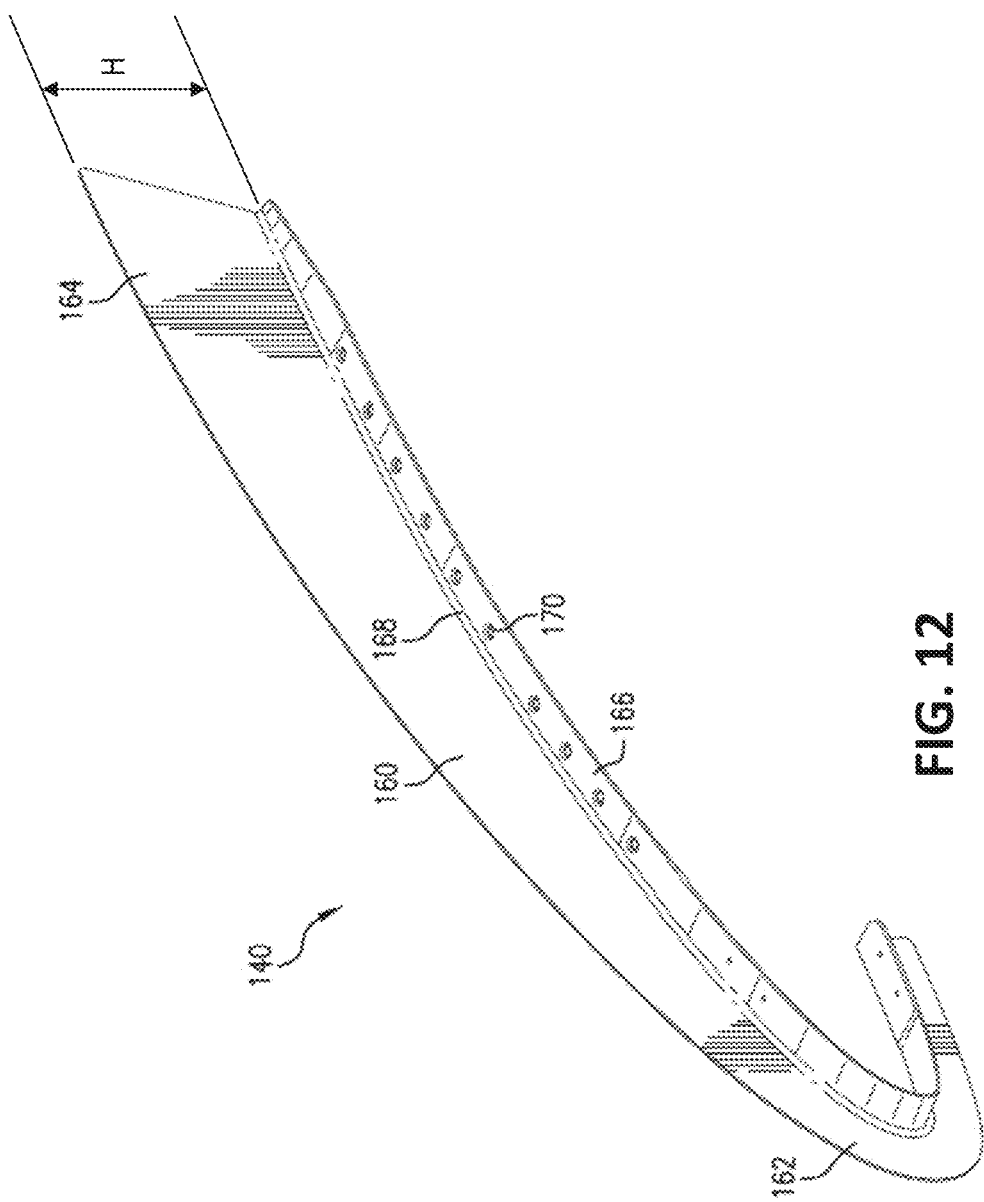
FIG. 12 is a perspective view of the flow fence shown in FIG. 6.
Figure 16:
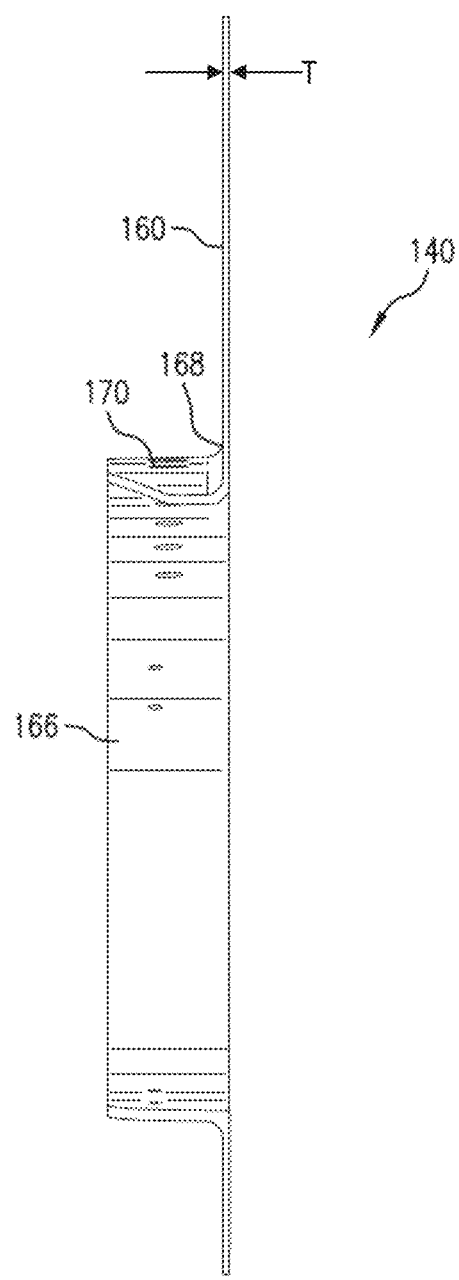

FIG. 12 is a perspective view of the flow fence 140 shown in FIG. 6. FIG. 13 is a top-down view of the flow fence 140 shown in FIG. 6. FIG. 14 is an aft view of the flow fence 140 shown in FIG. 6. FIGS. 15 and 16 are front views of the flow fence 140 shown in FIG. 6. The flow fence 140, which is shaped to conform to the wing 120, includes a one-piece or multiple-piece body 160 which extends from a leading edge portion 162 to a trailing edge portion 164. Although illustrated as having a constant thickness T (see FIG. 16), the body 160 of the flow fence 140 can have a varying thickness in a longitudinal direction (i.e., along the longitudinal axis X of FIG. 3). For this particular illustrated embodiment, a mounting flange 166 integral with the body 160 extends approximately perpendicularly from a mounting edge 168 of the body 160. The mounting flange 166 is provided with mounting apertures 170, and the mounting apertures receive fasteners (not shown) for attachment of the flow fence 140 to the wing 120. A height H of the flow fence 140 (see FIG. 12) is sized for a combination of considerations including but not limited to maintaining lateral stability at high sideslip with or without flow surface contamination, eliminating undesirable roll behavior at high sideslip angles, and part weight, cost and aesthetics while also limiting its effect on skin friction drag and induced drag associated with the wing 120. Further, the depicted aspect of the flow fence 140 has a C-shaped leading edge portion 162 with the mounting flange 166 following the shape of the leading edge portion 162. With this design, the mounting flange mounts to both the wing upper surface 126 and the wing lower surface 128. However, it should be appreciated that the configuration of the mounting flange 166 can differ depending on the embodiment of the flow fence 140 described above.

The flow fence 140 illustrated in FIG. 12 is attached by means of the mounting flange 166; however, it should be appreciated that alternative manners for securing the flow fence 140 to the wing 120 are contemplated. By way of example, the flow fence 140 can be integrated directly into the wing 120 via a joint on the wing; the flow fence 140 can be integrally formed with the wing 120 to define a unitary one-piece design for the wing 120 and flow fence 140; the flow fence 140 can be integrally formed with the winglet 136 to define a unitary one-piece design for the winglet 136 and flow fence 140; the flow fence 140 can be fastened, adhered or welded to the wing 120 through the use of an attachment flange on a mating side of the flow fence 140; the flow fence can be fastened, adhered or welded to the wing 120 along a faying edge of the flow fence 140; and the flow fence 140 can be provided with internal attachment flanges that are secured to internal wing or winglet structure.

Figure 17:
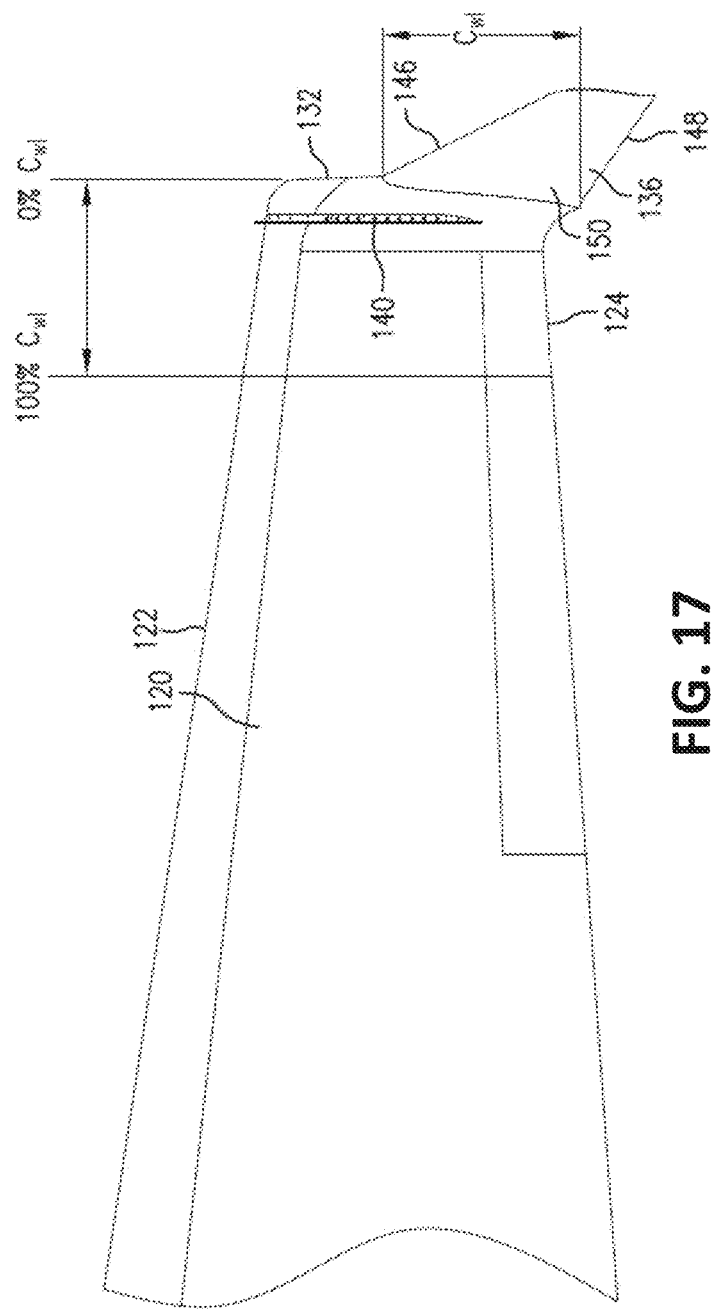
FIG. 17 depicts locating parameters of the flow fence along a wing lateral (spanwise) direction.

With reference to FIG. 17, in a top (planform) view of the wing 120 an inboard spacing of the flow fence 140 from the wingtip 132 does not exceed 100% of a length of the winglet root chord $C_{wl}$. According to one aspect, the inboard spacing of the flow fence 140 from the wingtip 132 does not exceed 60% of the length of the winglet root chord $C_{wl}$. According to another aspect, the inboard spacing of the flow fence 140 from the wingtip 132 does not exceed 30% of the length of the winglet root chord $C_{wl}$.

Figure 18:
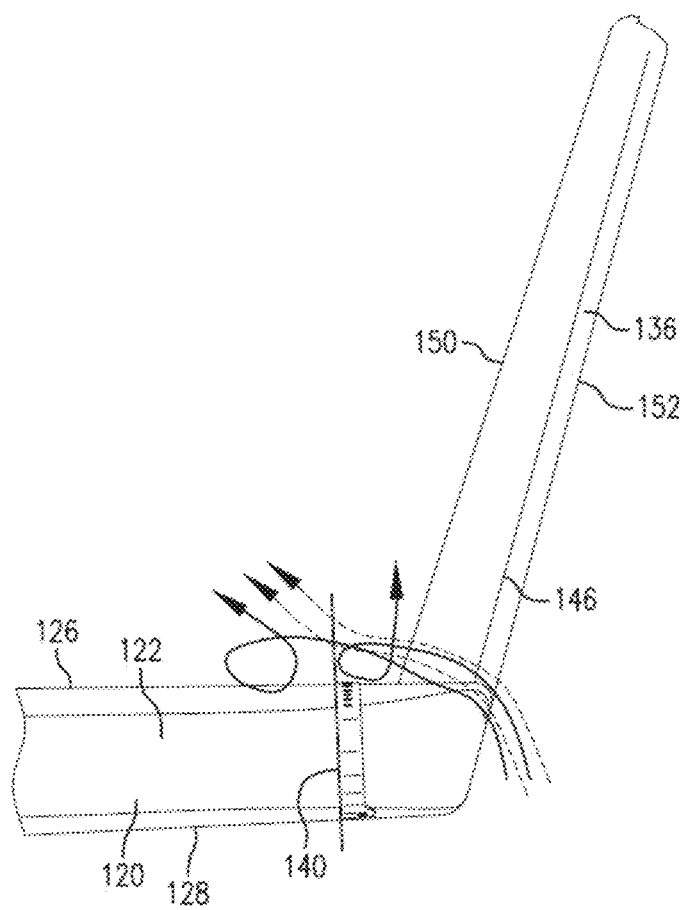
FIG. 18 illustrates airflow over the left-hand wingtip with and without the flow fence.

As depicted in FIG. 18, the mounting flange 166 provides a robust attachment of the flow fence 140 where airflow flows from the wing lower surface 128 to the wing upper surface 126 and inward around the wingtip 132 and winglet leading edge 146 at high sideslip angles. The flow fence 140 is adapted to generate vortices between the flow fence 140 and the winglet 136. Therefore, the vortices redirect airflow to limit low-pressure peaks on the winglet leading edge 146 to delay and/or reduce airflow separation on the winglet inboard surface 150 at high angle of sideslip. It should also be appreciated that the flow fence 140 is adapted to create positive pressurization. As is well known, increasing the side slip angle of the winglet 136 creates a sharp low-pressure peak. When the low-pressure peak becomes too high, negative airflow separates and over expands, and the airflow no longer attaches to the winglet inboard surface 150 (see FIG. 19). The positive pressure from the airflow at sideslip coming inboard and impacting the flow fence 140 limits (or reduces) the low-pressure peak and makes airflow separation on the winglet inboard surface 150 at high angle of sideslip less likely (see FIG. 20). The vortices redirect airflow back in the direction of potential airflow separation to delay and prevent airflow separation.

Further, with the positioning of the flow fence 140 relative to the wingtip 132 and the winglet 136 described above, the flow fence 140 is adapted to delay and/or prevent airflow separation on the winglet inboard surface 150 at high angle of sideslip, thereby increasing lateral stability and linearizing aircraft behavior at high angle of sideslip (see FIGS. 19-23). In addition, one aspect of the aircraft 100 is that the winglet leading edge 146 is devoid of an ice protection system. After ice contamination on the winglet leading edge 146 during flight into known icing conditions (or similarly after other flow surface contamination on the winglet leading edge 146 outside of flight into known icing conditions), the flow fence 140 is adapted to delay and/or reduce airflow separation on the winglet inboard surface 150 at sideslip conditions, further increasing lateral stability after ice or other contamination on the winglet leading edge 146. Accordingly, in the case of the aircraft 100, the airflow separation outside of icing occurs at high angles of sideslip. The flow fence 140 maintains airflow and increases the angle of sideslip where the airflow separation occurs, to a sideslip angle which is beyond what is required for aircraft type certification. With ice accretions built up on the winglet leading edge 146, or potentially with other flow surface contamination, the airflow separation occurs at essentially any angle of attack, at even mild angles of sideslip. The addition of the flow fence 140 reduces the amount of airflow separation and improves lateral controllability. It should be appreciated that exact angles are aircraft-dependent and could be different for alternative configurations of aircraft.

Figure 19:
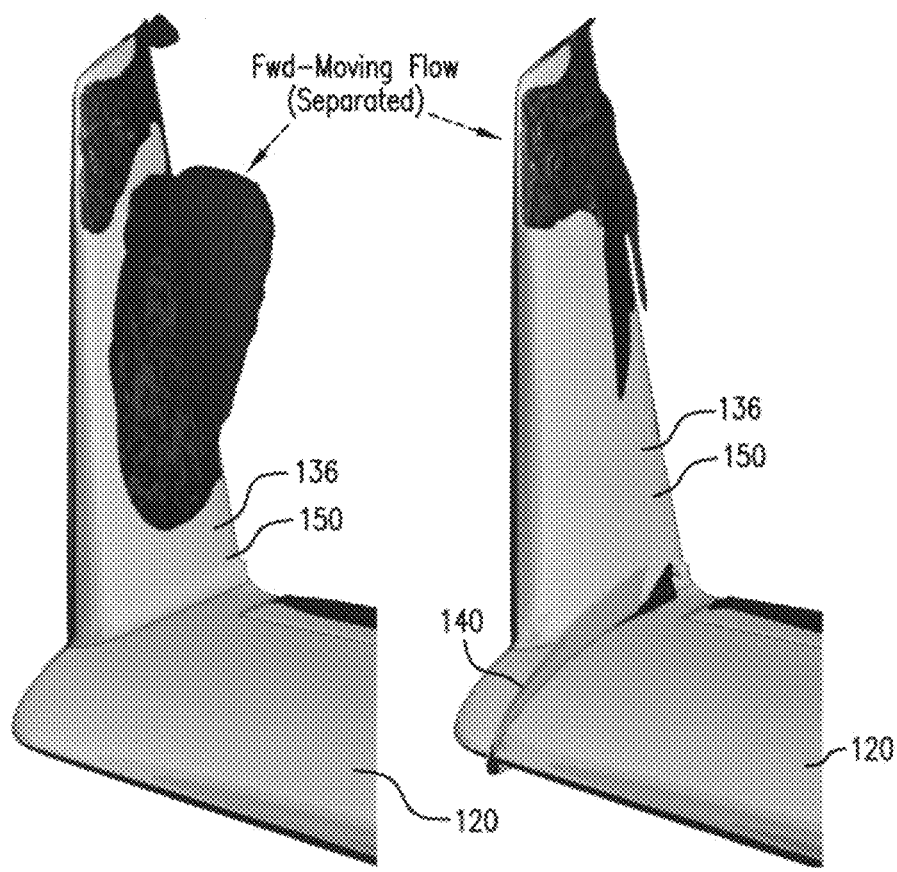
FIG. 19 illustrates airflow separation (in shaded black regions) at high sideslip angle over a winglet inboard surface of the winglet with and without the flow fence.

FIG. 19 illustrates computational results showing that with the flow fence 140 attached to the wing surface, airflow separation (in shaded black regions) on the winglet inboard surface 150 at high angle of sideslip can be delayed and/or prevented.

Figure 20:
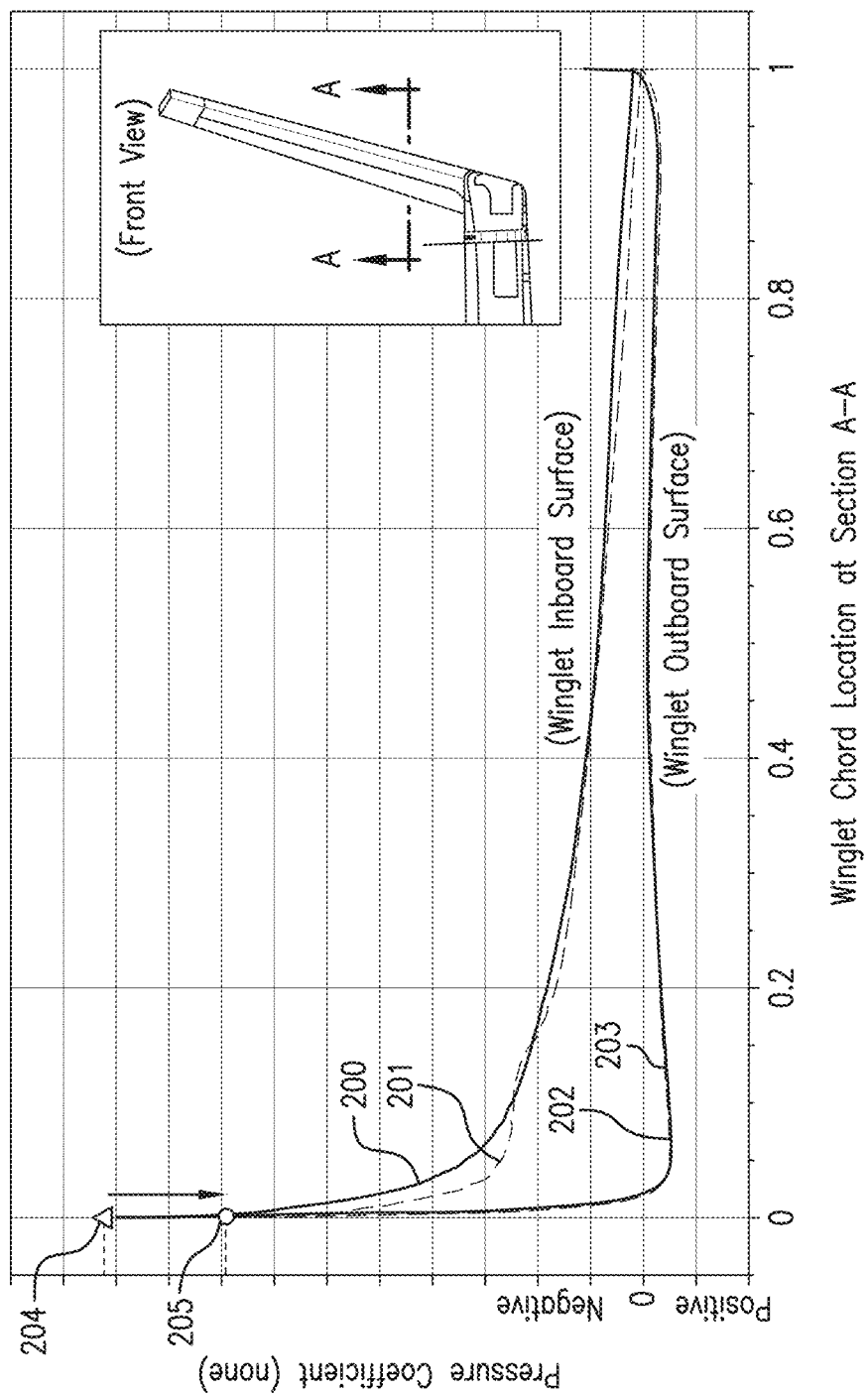
FIG. 20 illustrates pressure coefficient on the winglet inboard surface and the winglet outboard surface at section A-A and the reduction in winglet suction peak (which corresponds with a reduction in airflow separation) due to the flow fence.

FIG. 20 illustrates the effect the flow fence 140 has on the pressure coefficient (derived from the computational results) at winglet chord locations at Section A-A depicted in FIG. 20. Plot 200 is the pressure coefficient on winglet inboard surface 150 when flow fence 140 is not included on the wing 120. Plot 201 is the pressure coefficient on winglet inboard surface 150 when flow fence 140 is included on the wing 120. Plot 202 and plot 203 are respective pressure coefficient distributions on the winglet outboard surface 152 whether the flow fence 140 is or is not included on the wing 120 (i.e., the flow fence 140 does not substantially affect the pressure coefficient on the winglet outboard surface 152). Plot 200 and plot 201 show that positive pressure from the airflow at sideslip coming inboard around the wingtip 132 and impacting the flow fence 140 limits (or reduces) low-pressure peak on the winglet leading edge 146 and makes airflow separation on the winglet inboard surface 150 at high angle of sideslip less likely. In the example of FIG. 20, the low-pressure peak on the winglet leading edge 146 is reduced by approximately 20% when the flow fence 140 is included on the wing 120.

Figure 21:
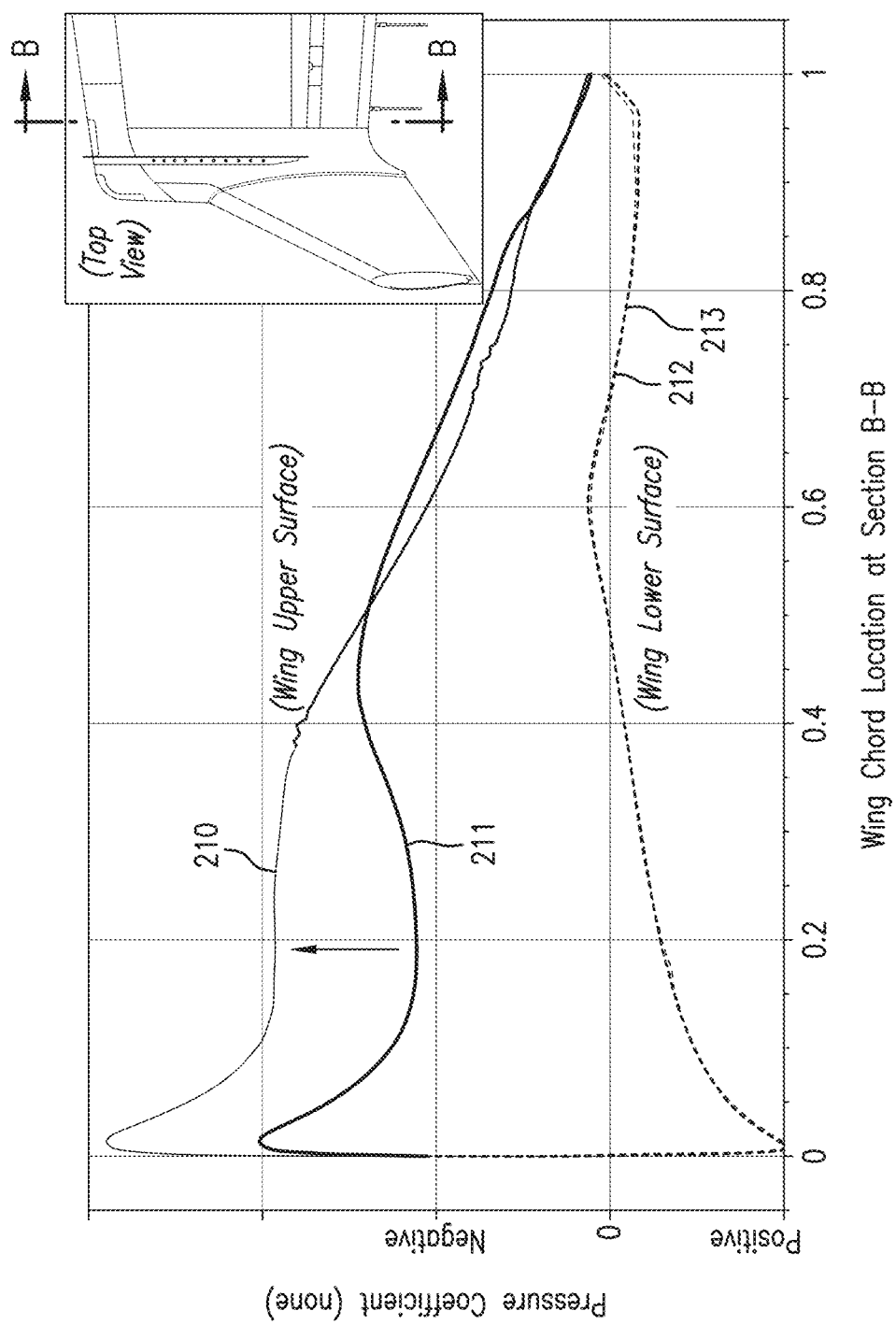
FIG. 21 illustrates pressure coefficient on the wing upper surface and the wing lower surface at section B-B and an improvement in outboard wing airflow due to the flow fence.

FIG. 21 illustrates the effect the flow fence 140 has on the pressure coefficient distributions at wing chord locations at Section B-B depicted in FIG. 21. Plot 210 is the pressure coefficient distribution on the wing upper surface 126 under positive lift and with the flow fence 140 included on the wing 120. Plot 211 is the pressure coefficient distribution on the wing upper surface 126 under positive lift and without the flow fence 140 included on the wing 120. Plot 212 and plot 213 are respective pressure coefficient distributions on the wing lower surface 128 whether the flow fence 140 is or is not included on the wing 120 (i.e., the flow fence 140 does not substantially affect the pressure coefficient on the wing lower surface 128). With the flow fence 140 attached to the wing surface, the pressure distribution on the wing upper surface 126 around the wingtip 132 changes and consequently delays and prevents airflow separation of the winglet inboard surface 150. Moreover, with the flow fence 140 attached to the wing surface, airflow reattaches to the winglet 136, increasing outboard wing lift.

Figure 22:
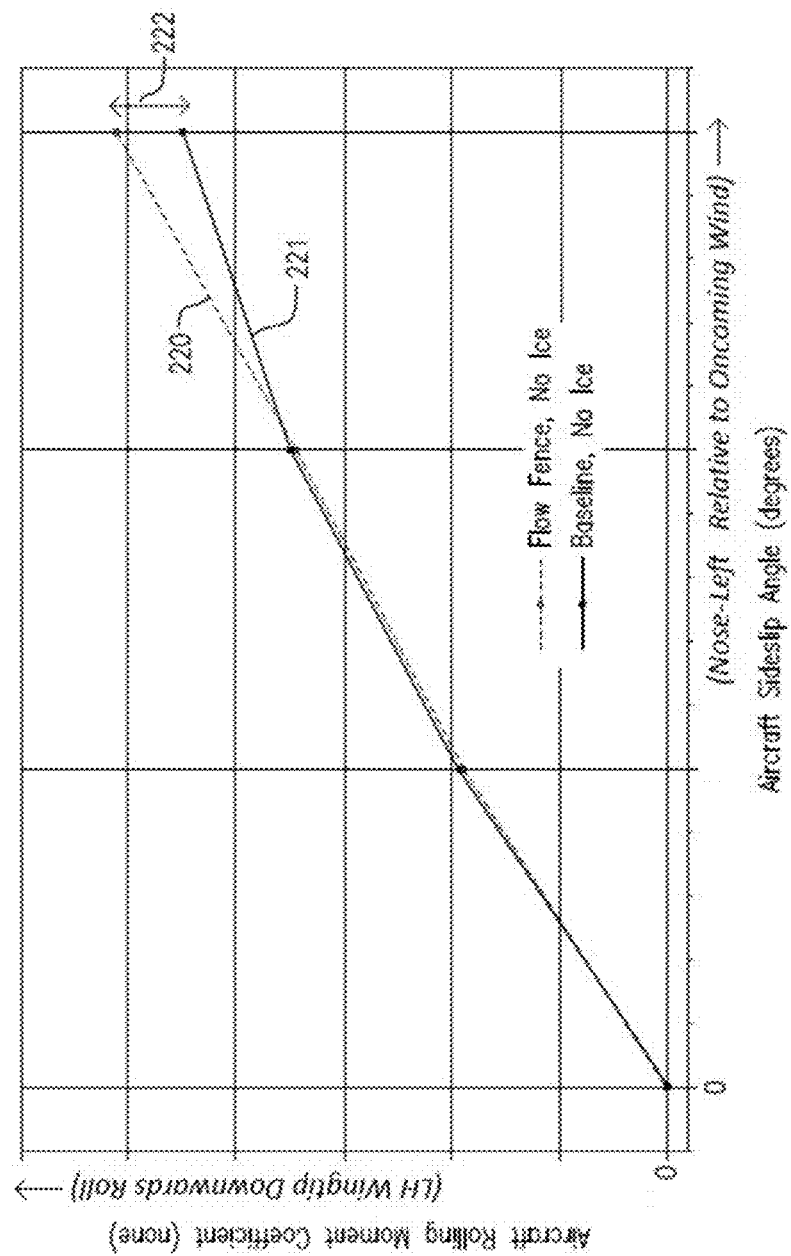
FIG. 22 illustrates aircraft rolling moment coefficient and computational results for lateral stability and rolling moment behavior at high sideslip angle with and without the flow fence.

FIG. 22 is a graph of aircraft rolling moment coefficient with respect to aircraft sideslip angle, with no flow surface contamination (e.g., ice, etc.). Plot 220 is the aircraft rolling moment coefficient with respect to aircraft sideslip angle when the flow fences 140 are included on the wings 120 of the aircraft 100. Plot 221 is the aircraft rolling moment coefficient with respect to aircraft sideslip angle when the flow fences 140 are not included on the wings 120 of the aircraft 100. A plot of these values having a higher slope equates to more positive lateral stability than a plot having a lower slope. Furthermore, a substantially linear plot equates to desirable controllability. FIG. 22 illustrates that at high sideslip angles, the aircraft rolling moment coefficient is higher when the aircraft includes the flow fences 140. Furthermore, the increased linearity of plot 220 compared to plot 221 illustrates a more desirable controllability. Line 222 is the improvement due to the flow fences 140.

Figure 23:
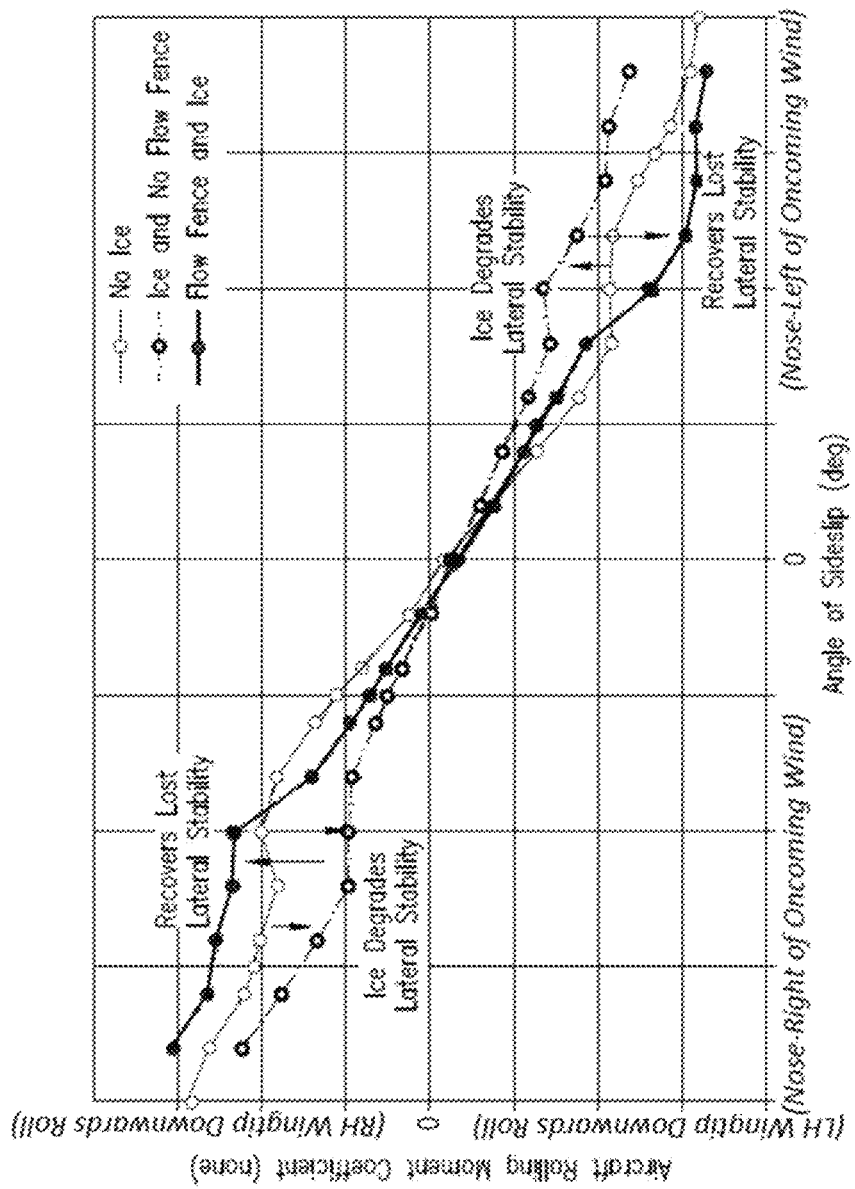
FIG. 23 illustrates aircraft rolling moment coefficient and wind tunnel test results for lateral stability and rolling moment behavior at high sideslip angle for a clean winglet without the flow fence, for an icing-contaminated winglet without the flow fence, and for an icing-contaminated winglet with the flow fence.
Figure 24:
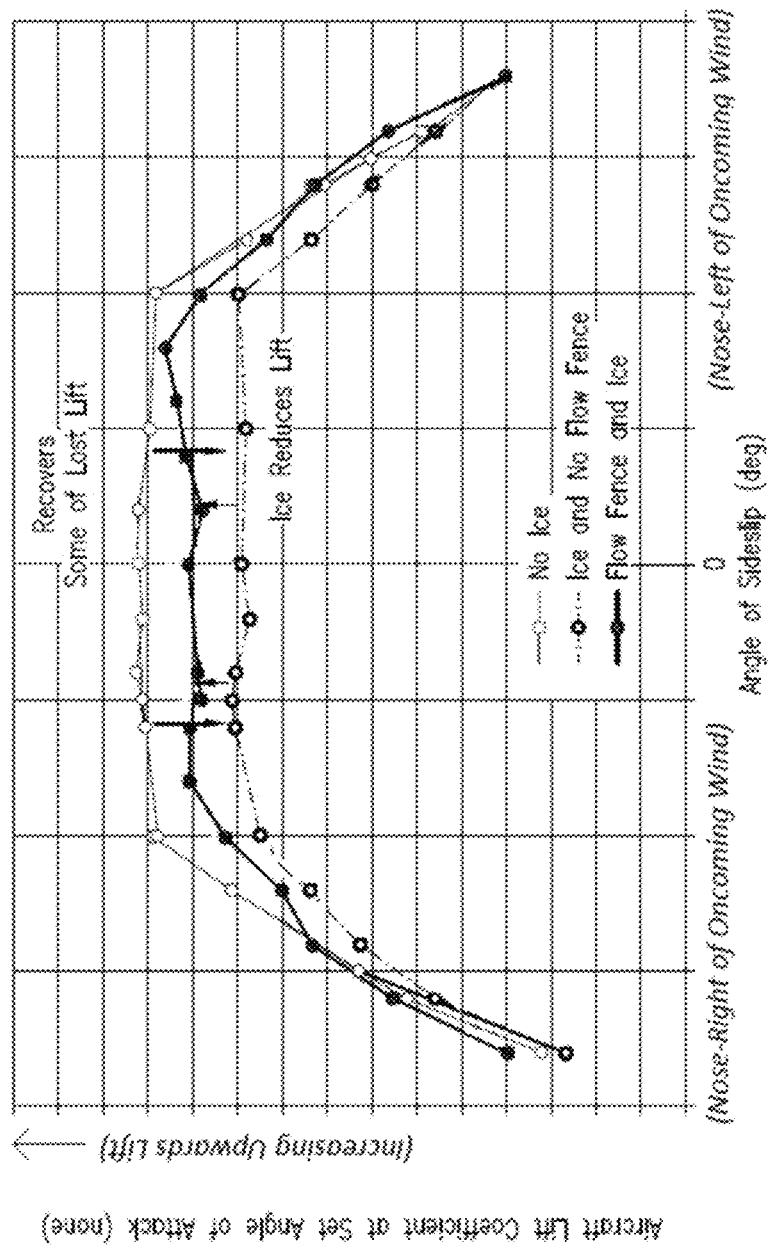
FIG. 24 illustrates aircraft lift coefficient and wind tunnel test results for aircraft lift at high sideslip angle for a clean winglet without the flow fence, for an icing-contaminated winglet without the flow fence, and for an icing-contaminated winglet with the flow fence.

FIG. 23 displays wind tunnel test results that demonstrate that in normal flight conditions (i.e., with no flow surface contamination) and without the flow fence 140 the lateral stability is generally linear to moderate angles of sideslip. After flow surface contamination, there can be a loss or degradation of positive lateral stability; however, with the flow fence 140 attached onto the wing surface positive lateral stability can be maintained (i.e., the slope is similar to the slope in normal flight conditions), which is an aircraft certification requirement. FIG. 24 displays wind tunnel test results that demonstrate that after flow surface contamination, there can be a decrease in aircraft lift associated with the winglet 136, and with the flow fence 140 attached the wing recovers a significant amount of the lift which was lost due to flow surface contamination.

A method for preventing airflow separation on the winglet inboard surface 150 at high angle of sideslip is also provided. The method generally comprises positioning the flow fence 140 on the wing upper surface 126 adjacent the winglet 136; in a top planform view of the wing 120, spacing the flow fence 140 inwardly from the wingtip 132 a distance not exceeding 100% of a length of the winglet root chord $C_{wl}$ (see FIG. 4); and extending the flow fence 140 on the wing upper surface 126 to a first position overlapping with the winglet 136. The method further includes locating the first position of the flow fence 140 between the winglet leading edge 146 and the wing trailing edge 124 and/or winglet trailing edge 148. The method further includes extending the flow fence 140 on the wing upper surface 126 to a second position located approximately at the wing leading edge 122 or aft of the wing leading edge 122. Alternatively, the method further includes wrapping the flow fence 140 around the wing leading edge 122 to a second position on a wing lower surface 128 of the wing 120, and locating the second position of the flow fence 140 on the wing lower surface 128 between the wing leading edge 122 and the wing trailing edge 124 and/or winglet trailing edge 148.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A wing of an aircraft comprising:
a wing leading edge, a wing trailing edge, and a wing surface defined by a wing upper surface and a wing lower surface, the wing extending from a wing root to a wingtip having a wingtip chord;
a winglet extending from the wingtip and having a winglet leading edge aft of the wing leading edge, a winglet trailing edge, a winglet inboard surface, a winglet outboard surface, a winglet root having a winglet root chord, and a winglet tip; and
a flow fence disposed on the wing surface inboard from the winglet in a top planform view of the wing, the flow fence overlapping with the winglet on the wing upper surface in an outboard side view of the winglet, where in the outboard side view the flow fence extends from a first position between the wing leading edge and the winglet leading edge on the wing lower surface around the wing leading edge to a second position between the winglet leading edge and the wing trailing edge and/or winglet trailing edge on the wing upper surface,
wherein the flow fence is adapted to generate vortices between the flow fence and the winglet by airflow flowing from the wing lower surface to the wing upper surface around the wingtip and the wing leading edge, wherein the vortices redirect airflow to limit low-pressure peaks on the winglet leading edge,
wherein the flow fence is adapted to delay and/or prevent airflow separation on the winglet inboard surface at high angle of sideslip, increasing lateral stability and linearizing aircraft behavior at high angle of sideslip.

2. The wing according to claim 1, wherein the flow fence is adapted to redirect airflow moving upwards and inward along the wing upper surface, back in a direction outboard and upward along the winglet inboard surface.

3. The wing according to claim 1, wherein the winglet leading edge is devoid of an ice protection system, and the flow fence is adapted to delay and/or reduce airflow separation on the winglet inboard surface at sideslip conditions after ice contamination on the winglet leading edge, further increasing lateral stability with a contaminated winglet leading edge surface.

4. The wing according to claim 1, where in the top planform view of the wing an inboard spacing of the flow fence from the wingtip does not exceed 100% of a length of the winglet root chord.

5. The wing according to claim 4, wherein the inboard spacing of the flow fence from the wing tip does not exceed 60% of the length of the winglet root chord.

* * * * *